Sept. 14, 1926.  1,599,610

A. Y. DODGE

BRAKE APPLYING CONNECTION

Filed May 22, 1926

INVENTOR
ADIEL Y. DODGE
BY
ATTORNEY

Patented Sept. 14, 1926.

1,599,610

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

BRAKE-APPLYING CONNECTION.

Application filed May 22, 1926. Serial No. 110,844.

This invention relates to brakes, and is illustrated as embodied in an automobile chassis having brakes on all four wheels. An object of the invention is to balance the forces acting on the brake-applying crossshaft, to neutralize any tendency to deflect the shaft, thus permitting a lighter shaft to be used.

In one desirable arrangement the shaft operates one pair of brakes, and an arm on the shaft is connected at its end to the pedal or the like, while at an intermediate point it is connected to the other pair of brakes in a novel manner such that the forces acting on the shaft neutralize each other, and there is no tendency to deflect the shaft.

The above and other objects and features of the invention, including various novel combinations and arrangements of the parts will be apparent from the following description of one illustrative embodiment shown in the accompanying drawing, in which.

Figure 1:
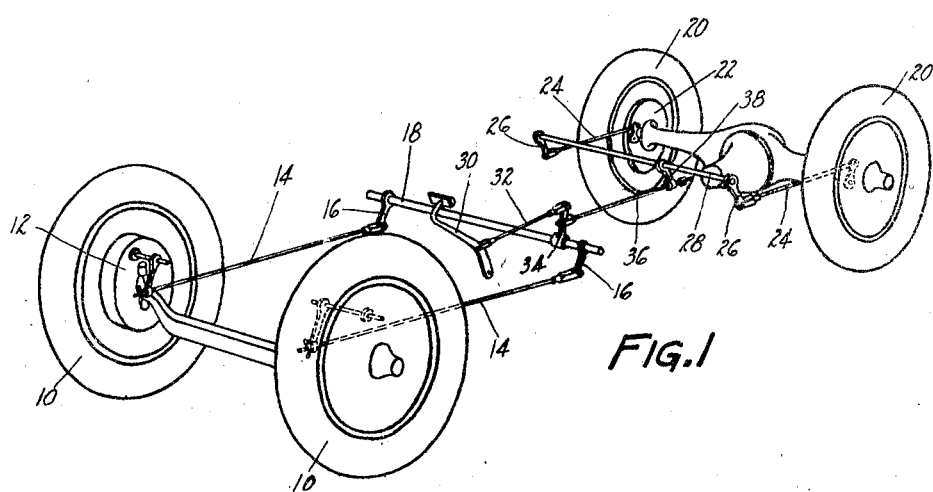
Fig. 1 is a perspective view of part of an automobile chassis.
Figure 2:
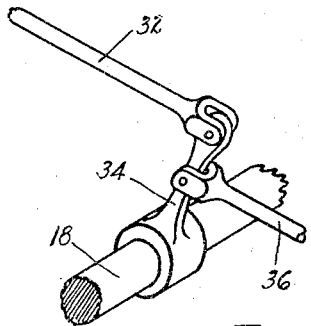
Fig. 2 is a perspective from a different point of view and on a larger scale of the above-described arm on the shaft.
Figure 3:
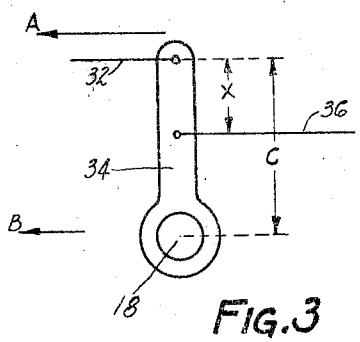
Fig. 3 is a diagram showing the arm on the shaft in side elevation, and indicating how the arrangement to balance the forces is calculated.

In the arrangement selected for illustration, the chassis includes front wheels 10 having brakes 12 operated by connections 14 from arms 16 projecting downwardly from a shaft 18, and rear wheels 20 having brakes 22 operated by connections 24 from arms 26 on a shaft 28. All four of the brakes are to be operated by a pedal 30 or its equivalent.

According to the present invention, pedal 30 operates through a link 32 connected to the end of an arm 34 secured to and operating the shaft 18, and between link 32 and the axis of shaft 18 there is connected to arm 34 a second link 36 extending rearwardly and connected to and operating an arm 38 on shaft 28.

The present invention relates to the manner of connecting link 36 or its equivalent to arm 34, to balance the bending forces acting on shaft 18. Of any force from the pedal, indicated by the vector "A", a certain amount goes to the rear brakes, the balance acting on shaft 18 to apply the front brakes and causing a force "B" tending to bend shaft 18 forwardly. The division of the force between front and rear brakes varies, and the various leverages in the hookup vary, so that there is no necessary general relation between "A" and "B", but with any given hookup their relation is fixed so that they may be regarded as known quantities. The length "C" of arm 34 is also a known quantity. Now if "X" be the distance from the connection 36 to the end of the effective lever arm "C", in order that the force on link 36 shall balance the bending force "B" on shaft 18, length "X" is determined by the formula:

$$\frac{A-B}{B} = \frac{C-X}{X}$$

That is, A—B (the force at the upper end of arm 34 acting on the rear brakes) is to the bending force B (which equals the force at the upper end of arm 34 acting on the front brakes), as the length of arm 34 below connection 36 is to the length above that connection.

To look at the forces from a sligthly different point of view, we may regard arm 34 as a lever fulcrumed on link 36, and pulled forwardly at its upper end by a force (A—B) acting to apply the rear brakes, and tending to rock the lower end of arm 34 rearwardly about fulcrum 36 with a force which we wish to equal "B". Now the force A—B at the upper end of the lever, multiplied by the ratio $$\frac{X}{C-X}$$

of the two arms of the lever, gives this balancing force, which we equate against "B" thus:

$$B = \frac{(A-B)X}{C-X}$$

or, as before:

$$\frac{A-B}{B} = \frac{C-X}{X}$$

While one illustrative embodiment has been described in detail, it is not my intention to limit the scope of the invention to that particular embodiment, or otherwise than by the terms of the appended claim.

I claim:

A vehicle having front and rear pairs of brakes and a brake pedal, and comprising, in combination therewith, a shaft operating one pair of brakes and having an operating arm secured thereto and projecting therefrom, a device connecting the end of the arm to the pedal and extending forwardly from the shaft, and another device extending rearwardly from the shaft and operating the other pair of brakes and connected to the arm between the first device and the axis of the shaft, and in which the length "X" between the connections of the two devices to the arm is determined by the following formula, in which "A" denotes the force applied to the end of the arm from the pedal, "B" denotes the force tending to bend the shaft due to the force acting to apply the front brakes, and "C" denotes the effective length of the arm, the formula being:

$$\frac{A-B}{B}=\frac{C-X}{X}$$

In testimony whereof, I have hereunto signed my name.

ADIEL Y. DODGE.